A. A. HILL.
BREAD TOASTER.
APPLICATION FILED APR. 13, 1909.

969,475.

Patented Sept. 6, 1910.
2 SHEETS—SHEET 1.

Witnesses:
Frank S. Ober
James D'Antoni

Inventor
Arthur A. Hill
By his Attorneys
Rosenbaum & Stockbridge

A. A. HILL.
BREAD TOASTER.
APPLICATION FILED APR. 13, 1909.

969,475.

Patented Sept. 6, 1910.
2 SHEETS—SHEET 2.

Witnesses:
Frank S. Ober
James D'Antonio

Inventor
Arthur A. Hill
By his Attorneys
Rosenbaum Stockbridge

UNITED STATES PATENT OFFICE.

ARTHUR A. HILL, OF NEW YORK, N. Y.

BREAD-TOASTER.

969,475.     Specification of Letters Patent.     Patented Sept. 6, 1910.

Application filed April 13, 1909. Serial No. 489,707.

*To all whom it may concern:*

Be it known that I, ARTHUR A. HILL, a citizen of the United States, residing at the city of New York, in the borough of the Bronx and State of New York, have invented certain new and useful Improvements in Bread-Toasters, of which the following is a full, clear, and exact description.

This invention relates to an apparatus for toasting or grilling bread, meat or other food articles, adapted to give as great uniformity as possible in the grilling or toasting action.

The common way of making toast with a gridiron has numerous disadvantages and objections, among which may be mentioned the labor and inconvenience of holding the gridiron over the fire, and the limited capacity of any ordinary gridiron, particularly when used with a small fire or gas stove. But even more serious are the defects of inequality in the toasting action and the liability of the bread to scorch on its surface before it is really browned and toasted through. These latter defects are particularly aggravated in the use of a gas stove, which is now extensively employed for cooking.

It is the purpose of my invention to provide a simple toasting or grilling apparatus for overcoming all the foregoing defects and which is particularly adapted for use with a gas stove.

With this object in view my invention consists in the features of construction and combination hereinafter set forth and claimed.

Figure 1:
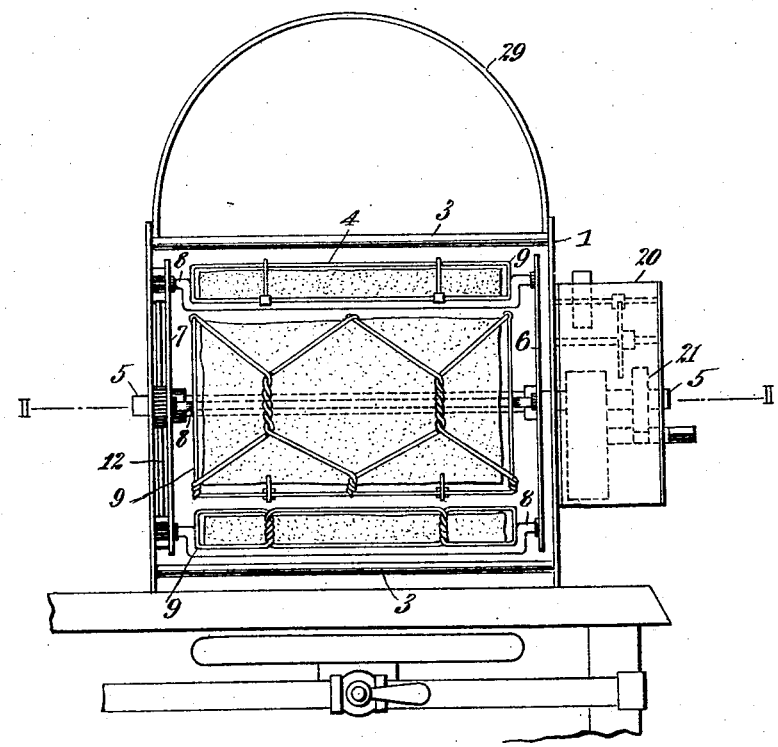
Figure 2:
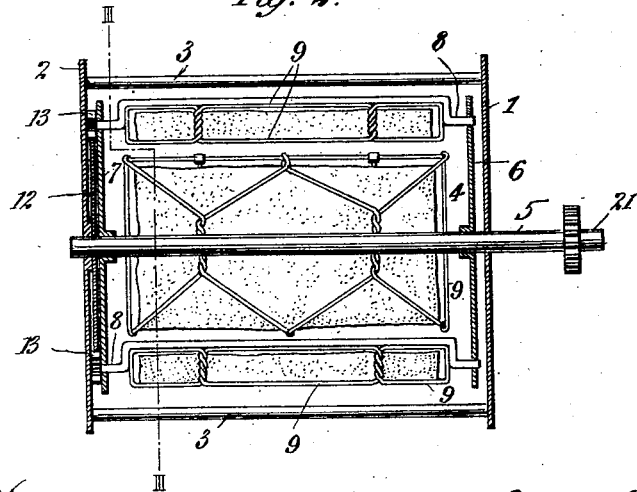
Figure 3:
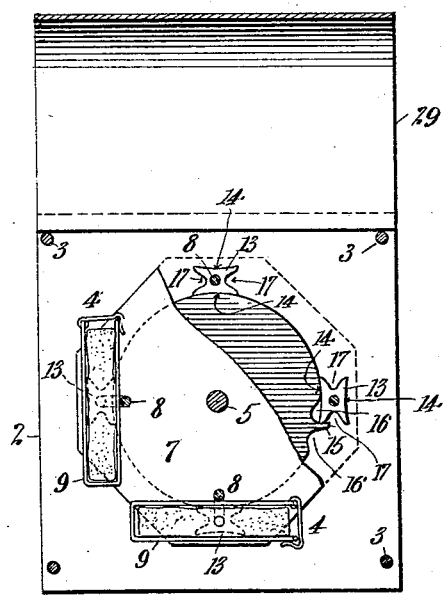
Figure 4:
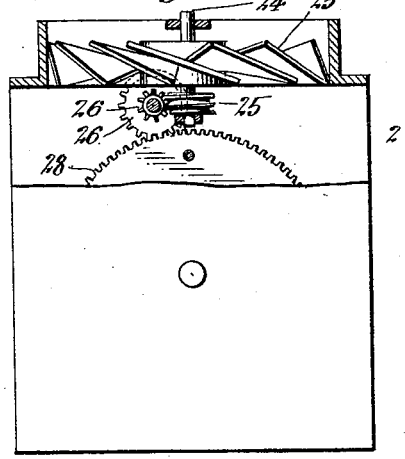

In the drawings: Figure 1 is a side elevation of a bread toaster embodying the principles of my invention, illustrating its use with a gas stove. Fig. 2 is a transverse sectional view on the line II—II of Fig. 1, the spring motor being removed. Fig. 3 is a vertical sectional view on the line III—III of Fig. 2 looking toward the left and partly broken away. Fig. 4 is a side elevation illustrating a modified arrangement.

Referring to the drawings in which like parts are designated by the same reference sign, 1 denotes the main frame or casing of the machine, preferably comprising parallel plates 1 and 2, rigidly connected by rods 3 at each corner.

4 designates what I term a planetary grill carrier, being a means for supporting and moving a plurality of grills or gridirons in a planetary manner with relation to a fixed gas flame or fuel bed. For the foregoing purpose I have devised a simple arrangement including grills or gridirons swiveled on separate axes, parallel to and equally distant from a common central axis. The gridiron axes are carried around the central axis in a movement of revolution, and are caused to turn through half a rotation on their own axes during, or at the end of every revolution about said central axis.

5 denotes an arbor journaled in the frame plates 1 and 2, and carrying between the latter a pair of disks or plates 6 and 7 fixed to the arbor and rotating therewith.

8 denotes spindles on axes parallel to and equally distant from the central arbor 5, and which pass loosely through appropriate holes for this purpose in the disks 6 and 7. Each spindle 8 has the main portion of its length between the disks 6 and 7 cranked or offset from the line of its axis, and within this cranked or offset portion of the spindle I secure a wire grill, gridiron or toaster 9, adapted to receive a slice of bread or the like.

The spindles with their grills may be given the movements of revolution and rotation as above mentioned, in any desired manner, but I prefer to make use of the mechanism which I have devised and illustrated for this purpose.

12 denotes a circular plate fixed to the frame plate 2 between the latter and the adjacent movable disk 7, being coaxially positioned with respect to the latter. Each spindle 8 projects somewhat beyond this supporting disk 7, and carries what may be termed a pinion 13 adjacent to and contacting with the periphery of the fixed disk 12. I term the parts 13 pinions because at a certain position of their displacement around the plate or disk 12, they have an action which is something like a Geneva stop motion gear and pinion combination. Each pinion 13 is illustrated with two concave faces 14 adapted to coincide with and be guided by the rounded periphery of the fixed plate or disk 12, depending on which of said concave faces happens to be in engagement. At one point of the periphery of the fixed plate or disk 12 there is formed a single tooth 15 with recesses 16 on each side thereof, and the pinion 14 has notches 17 at each end adapted to mesh with the tooth 15 and effect a rotation of the pinion through half a turn. At the completion of this semi-rotation the opposite concave face 14 of the pinion comes into engagement with the periphery of the plate or disk 12 and continues thus throughout the remainder of the angular displacement or planetary motion about the central arbor. The effect of this is to make each spindle 8 act as though it were rigidly fixed in its revolving frame throughout substantially the entire revolution of the latter, but each spindle reverses itself or moves through half a rotation at a certain point in the revolution of its supporting frame. I prefer this latter occurrence to take place about midway of the movement of each spindle from its upper toward its lowermost position. In this way each grill or toaster 9 is maintained substantially horizontal in its upper and lowermost positions when it is most centrally located over the fire.

The planetary grill frame 4 may be rotated on its central axis in any desired manner. I have illustrated two simple arrangements, one of which comprises a spring motor 20 secured to the frame plate 1 and operating to drive the arbor 5 through a pinion 21 fixed thereto. Another simple arrangement comprises a fan or vane wheel 23 rotating on a vertical spindle 24 in the path of the current of hot air which normally flows upwardly through the appliance. This vane wheel is geared through the worm 25 and pinions 26 and 27 with a large gear 28 forming a part of the planetary grill frame. The vane wheel 23 may be made somewhat heavy so as to have sufficient inertia to carry the grills past their reversing points. In the case of the spring motor I prefer to inclose the entire upper part of the apparatus by a hood 29 which conserves the hot air, forming a sort of oven in which bread or the like may toast more rapidly and thoroughly.

The use of the apparatus will be obvious from the foregoing description.

It is merely necessary to insert slices of bread, or the like, in the grills 9 and start the spring motor 20, the apparatus being placed over the flame of the gas stove or other fuel bed. The hot gases pass upwardly among the slices of bread, heating and browning the latter and being particularly efficient against the underside of the lowermost slice. As all the slices of bread are in continuous motion and periodically rotated on their axes, or reversed, it is evident that the toasting effect is evenly distributed to all the slices, and no slice or portion of a slice receives more than its proper share of the toasting action. No supervision of the working of the apparatus is therefore required, the attention of the house keeper being free for any other purpose. After a certain time, which may be varied considerably without any danger of burning the bread, the latter may be removed, and will be found perfectly and evenly toasted, crisp and brown and thoroughly cooked through, in a most agreeable and approved fashion.

What I claim is:—

1. A toaster or grilling device comprising a rotatable frame having a plurality of grills, means for giving the grills a planetary movement, and means for giving them a complete half turn on their axes during a small arc of their planetary movement, the grills being held immovable on their axes during the remainder of their planetary movement.

2. In a toaster or grilling device, a revoluble frame, a plurality of grills pivoted on separate axes therein and capable of independent rotation on said axes, means for continuously revolving the frame and means for periodically rotating the grills on their axes.

3. In a toaster or grilling device, a revoluble frame, a plurality of grills pivoted in said frame and capable of rotating on their separate axes, means for continuously revolving the frame, and means actuated by the movement of the frame for periodically rotating said grills on their axes.

4. In a toaster or grilling device, a revoluble frame, a plurality of grills pivoted in said frame and capable of rotating on their separate axes, means for continuously revolving the frame, and means actuated by the movement of said frame for periodically giving a half turn to said grills on their axes during each revolution of the frame.

5. In a toaster or grilling device, a revoluble frame, a plurality of grills pivoted in said frame and capable of rotating on their separate axes, means for continuously revolving the frame, and means actuated by the movement of said frame for periodically giving a half turn to said grills on their axes at a certain point in the revolution of said frame.

6. A toaster or grilling device comprising a revoluble frame, a plurality of spindles pivoted therein and having offset portions, grills fixed to said spindles at the location of said offset portions, means for revolving said frame on its axis, and means actuated by the revolution of the frame for rotating said spindles on their axes.

7. In a toaster or grilling device, a revoluble frame, a plurality of spindles having grills and pivoted in said frame, pinions having a pair of concave faces on each of said spindles, and a fixed plate or disk having a single tooth and acting on said pinions to turn the same through half a revolution at the completion of each revolution of the frame.

8. In a toaster or grilling device, a rotatable frame, a plurality of spindles pivoted in said frame, grills fixed to said spindles, a fixed plate or disk having a single tooth on one side, pinions on said spindles formed to coöperate with said single tooth to give half a turn to the spindles in passing said tooth, and a motor for revolving said frame.

In witness whereof, I subscribe my signature, in the presence of two witnesses.

ARTHUR A. HILL.

Witnesses:
 WALDO M. CHAPIN,
 WILLIAM C. LARY.